(12) United States Patent
Wegener et al.

(10) Patent No.: US 8,746,212 B2
(45) Date of Patent: Jun. 10, 2014

(54) METHOD AND DEVICE FOR OPERATING AN INTERNAL COMBUSTION ENGINE HAVING A MASS FLOW LINE

(75) Inventors: Sabine Wegener, Tamm (DE); Lutz Reuschenbach, Stuttgart (DE); Patrick Menold, Stuttgart (DE); Kristina Milos, Leonberg (DE); Michael Drung, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 867 days.

(21) Appl. No.: 12/735,676

(22) PCT Filed: Nov. 27, 2008

(86) PCT No.: PCT/EP2008/066330
§ 371 (c)(1),
(2), (4) Date: Nov. 18, 2010

(87) PCT Pub. No.: WO2009/112108
PCT Pub. Date: Sep. 17, 2009

(65) Prior Publication Data
US 2011/0048375 A1   Mar. 3, 2011

(30) Foreign Application Priority Data

Mar. 10, 2008   (DE) .................. 10 2008 000 581

(51) Int. Cl.
*F02C 1/00*   (2006.01)
(52) U.S. Cl.
USPC .................................................. 123/444
(58) Field of Classification Search
USPC ......... 123/336, 361, 367, 376, 399, 444, 478, 123/480, 683, 684
See application file for complete search history.

(56) References Cited

U.S. PATENT DOCUMENTS

| | | | |
|---|---|---|---|
| 6,422,202 B1 * | 7/2002 | Wild | 123/399 |
| 6,513,493 B1 | 2/2003 | Robichaux et al. | |
| 6,769,395 B2 * | 8/2004 | Jaksch et al. | 123/336 |
| 6,968,824 B1 * | 11/2005 | Matthews et al. | 123/350 |
| 7,856,305 B2 * | 12/2010 | Eiraku | 701/103 |
| 8,155,863 B2 * | 4/2012 | Hsu et al. | 701/104 |
| 8,209,112 B2 * | 6/2012 | Hartmann et al. | 701/114 |
| 2001/0011454 A1 * | 8/2001 | Pfleger et al. | 60/285 |
| 2005/0056251 A1 | 3/2005 | Stroh et al. | |
| 2005/0096835 A1 * | 5/2005 | Piwonka et al. | 701/115 |
| 2006/0102144 A1 | 5/2006 | Muto et al. | |
| 2007/0055436 A1 * | 3/2007 | Weiss et al. | 701/101 |
| 2008/0033628 A1 * | 2/2008 | Guzzella et al. | 701/103 |

FOREIGN PATENT DOCUMENTS

| | | |
|---|---|---|
| DE | 10 2004 044 994 | 4/2005 |
| DE | 10 2005 007 057 | 8/2006 |
| EP | 1 657 421 | 5/2006 |
| JP | 2007-056698 | 3/2007 |
| WO | WO 2007/023345 | 3/2007 |

* cited by examiner

*Primary Examiner* — John Kwon
*Assistant Examiner* — Johnny Hoang
(74) *Attorney, Agent, or Firm* — Kenyon & Kenyon LLP

(57) ABSTRACT

A method and a device for operating an internal combustion engine having a mass-flow line are provided, which allow the actual charge to be adapted to the setpoint charge of the internal combustion engine at a desired dynamic. A mass flow is supplied to the internal combustion engine via the mass-flow line. A setpoint value is specified for a characteristic quantity of the mass flow to the internal combustion engine. The setpoint value of the characteristic quantity of the mass flow is formed starting from a balance of the mass flow flowing into the mass flow line and the mass flow discharged from the mass flow line according to a predefined time characteristic.

15 Claims, 2 Drawing Sheets

METHOD AND DEVICE FOR OPERATING AN INTERNAL COMBUSTION ENGINE HAVING A MASS FLOW LINE

BACKGROUND OF THE INVENTION

1. Field of the Invention

The present invention is based on a method and a device for operating an internal combustion engine having a mass flow line.

2. Description of Related Art

From published German patent document DE 10 2005 007 057 A1, for example, a charge control is known which seeks a dynamically precise control. In so doing, a characteristic value of the dynamic behavior of a parameter is determined. This allows for an exact adjustment of a charge of a cylinder. A corresponding air model may be used to determine the instantaneously aspirated air quantity or the air quantity that is imminently going to be aspirated, based on the current setting variables in conjunction with the pressure, the temperature and mixture status in the intake manifold, and the rotational engine speed. The inverted function may be used to selectively modify the influence quantities of the aspirated volume in order to adjust an appropriate air quantity for the target value of the torque.

BRIEF SUMMARY OF THE INVENTION

In contrast, the method according to the present invention and the device for operating an internal combustion engine including a mass flow line according to the present invention have the advantage that the setpoint value of the characteristic quantity of the mass flow is formed on the basis of a balance of the mass flow entering the mass flow line and the mass flow discharged from the mass flow line, in accordance with a predefined time characteristic. In particular if it is subject to sudden changes, a desired output quantity of the internal combustion engine according to a defined or desired dynamic is able to be implemented nevertheless, via the predefined time characteristic for the setpoint value of the characteristic quantity of the mass flow. Thus, an actual value of the characteristic quantity of the mass flow is likewise able to follow the setpoint value at the same desired dynamic, for example within the framework of a control.

In this context it is advantageous if a setpoint value for this mass flow is selected as a setpoint value of the characteristic quantity of the mass flow, and if the mass flow entering the mass flow line is selected as the setpoint value for the mass flow in the balance of the mass flow flowing into the mass flow line and the mass flow discharged from the mass flow line. This makes it possible to form the setpoint value of the characteristic quantity of the mass flow in an especially simple manner and with little effort.

Another advantage results if the predefined time characteristic is selected as a time characteristic according to a proportional time element, preferably of the first order, using a predefined time constant. This makes it possible to insert the predefined time characteristic for the setpoint value of the characteristic quantity of the mass flow in the balance of the mass flow flowing into the mass flow line and the mass flow discharged from the mass flow line in an especially simple manner requiring little effort, without the accuracy of the balance being adversely affected to any significant degree.

A further advantage results if a temporal change of the mass in the mass flow line is formed as the difference between the inflowing mass flow and the discharged mass flow, and if this relationship is resolved for the inflowing mass flow in order to determine the setpoint value of the characteristic quantity of the mass flow, and the temporal change of the mass in the mass flow line is replaced by the predefined time characteristic. This constitutes an especially simple and low-cost realization for determining the setpoint value of the characteristic quantity of the mass flow according to the predefined time characteristic in a manner that requires little computational outlay.

In this context it is advantageous if the relationship for determining the setpoint value of the characteristic quantity of the mass flow is solved for the inflowing mass flow, taking the ideal gas equation into account, so that the temporal change of the mass in the mass flow line is converted into a temporal change of the pressure in the mass flow line when forming a setpoint value for the pressure as a function of a desired output quantity of the internal combustion engine, and when forming the temporal change of the pressure as a difference quotient from the difference between the setpoint value for the pressure and an instantaneous pressure per time unit. The desired output quantity may thus be implemented in a simple and low-cost manner with the aid of the setpoint value of the characteristic quantity of the mass flow according to the predefined or desired time characteristic.

Another advantage results if the predefined time constant is selected as a unit of time. Thus, to implement the desired output quantity, the time characteristic according to the proportional time element may be specified as desired or specified time characteristic in a simple and low-cost manner. In addition, it is advantageous if the specified time characteristic is determined in view of a desired fuel consumption and/or a desired response behavior and/or a desired reproducibility for adjusting a desired output quantity of the internal combustion engine by means of the setpoint value of the characteristic quantity of the mass flow. Thus, by implementing the desired output quantity with the aid of the setpoint value of the characteristic quantity of the mass flow according to the specified time characteristic, it is possible to optimize the fuel consumption and/or the response behavior and/or a desired reproducibility for adjusting the desired output quantity of the internal combustion engine with the aid of the setpoint value of the characteristic quantity of the mass flow.

BRIEF DESCRIPTION OF THE SEVERAL VIEWS OF THE DRAWINGS

An exemplary embodiment of the present invention is represented in the drawing and explained in greater detail in the following description.

The figures show.

DETAILED DESCRIPTION OF THE INVENTION

Figure 1:
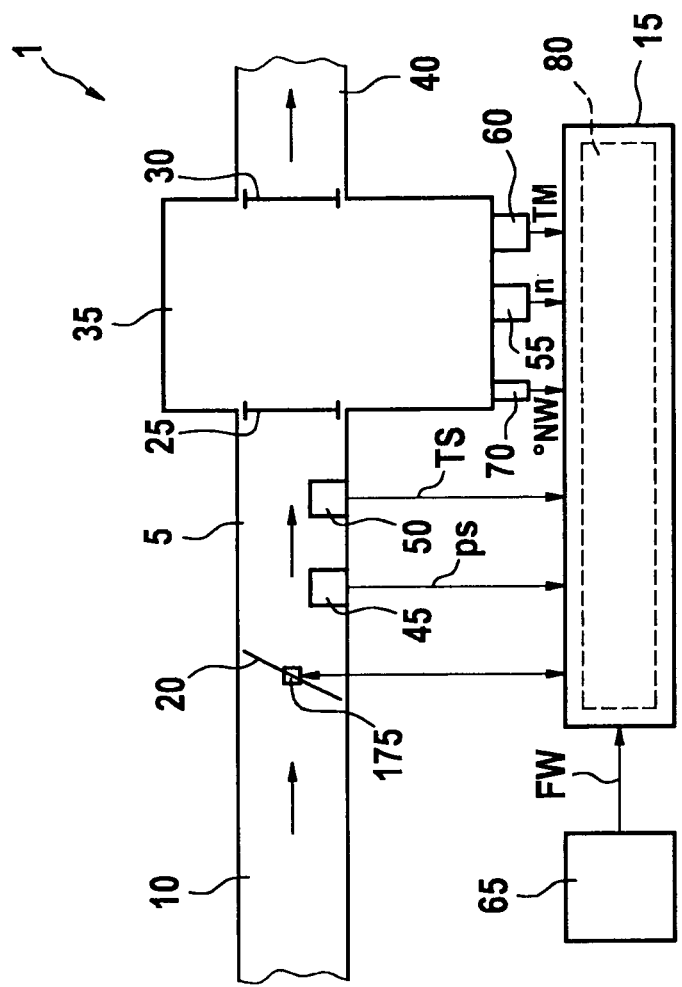
FIG. 1 shows a schematic view of an internal combustion engine.

In FIG. 1, 1 denotes an internal combustion engine implemented in the form of an Otto engine or a Diesel engine, for example. Internal combustion engine 1 has one or a plurality of cylinder(s), one of which is shown in FIG. 1 by way of example and denoted by reference numeral 35. Via an air supply 10, fresh air is supplied to cylinder 35. The flow direction of the fresh air in air supply 10 is indicated by arrows in FIG. 1. An actuator, e.g., in the form of a throttle valve, whose position or opening degree influences the air mass flow to cylinder 35, is disposed in air supply 10. The position or the opening degree of actuator 20 is adjusted by an engine control 15, using a control loop which is not shown in FIG. 1. An actual position of actuator 20 is adjusted to a setpoint position of actuator 20. The actual position may be recorded by a position sensor in the region of actuator 20 such as a potentiometer, for example, and forwarded to engine control 15. Such a position sensor is denoted by reference numeral 175 in FIG. 1. The setpoint position of actuator 20 is able to be determined in engine control 15 as a function of a setpoint air mass flow to cylinder 35; for instance, it is possible to determine the setpoint air mass flow in engine control 15, for example, as a function of one or more coordinated demands with regard to a torque to be delivered by internal combustion engine 1, or an output to be provided by internal combustion engine 1. In the least complicated case, as indicated in FIG. 1, the setpoint air mass flow is formed as a function of a driver-desired torque FW, which is transmitted to engine control 15 by a driving-pedal module 65. Driving-pedal module 65 forms driver-desired torque FW as a function of the actuation degree of a driving pedal of a vehicle driven by internal combustion engine 1. The formation of the setpoint air mass flow is described in the following text with the aid of a function diagram according to FIG. 2. Downstream from throttle valve 20, air supply 10 transitions into an intake manifold 5 in which an intake manifold pressure sensor 45 and an intake manifold temperature sensor 50 are disposed. Intake manifold pressure sensor 45 measures instantaneous intake manifold pressure ps and transmits the measured values to engine control 15. Intake manifold temperature sensor 50 measures the instantaneous intake manifold temperature TS and forwards the measured values to engine control 15. Via an intake valve 25, the fresh air is finally aspirated into a combustion chamber of cylinder 35. Intake valve 25 may be adjusted with regard to its opening instant or its opening duration either by a camshaft or by an electro-hydraulic or electromechanical valve control. In the example according to FIG. 1 it should be assumed that the opening time and the opening duration of intake valve 25 is opened and closed by an intake camshaft in the manner known to one skilled in the art. The control of the opening instant and the opening duration of a discharge valve 30 for discharging the exhaust gas formed during the combustion of air and fuel in the combustion chamber of cylinder 35 into an exhaust tract 40 takes place in the same manner, it being assumed once again in FIG. 1 that discharge valve 30 is controlled with regard to the opening and closing of discharge valve 30 via a discharge camshaft. The supply of fuel into the combustion chamber of cylinder 35 is not shown in FIG. 1 for reasons of clarity; it may take place either directly or via intake manifold 5, or via air supply 10 with the aid of one or a plurality of suitable injection valve(s). In the case of an Otto engine, a spark plug is provided in addition, which ignites the air/fuel mixture inside the combustion chamber of cylinder 35.

A camshaft sensor 70 in the region of cylinder 35 or the intake or discharge camshaft determines the actual camshaft setting in ° CS and forwards the measured values to engine control 15. Using the instantaneous camshaft setting ° CS of the intake or discharge camshaft, engine control 15 is able to detect whether intake valve 25 is open or closed just then, and whether discharge valve 30 is open or closed just then, in the manner known to one skilled in the art. From the setting of the intake camshaft it is also possible to infer the opening state of discharge valve 30 based on a fixed relationship between the opening and closing times of intake valve 25 and discharge valve 30 over the crank angle. As an alternative, a separate camshaft sensor for the intake camshaft, and a camshaft sensor for the discharge camshaft may be provided as well.

An rpm sensor 55 in the region of cylinder 35 or the crankshaft driven by cylinder 35 determines instantaneous engine speed n and forwards the measured values to engine control 15. An engine temperature sensor 60 measures instantaneous engine temperature TM and forwards the measured values to engine control 15. For instance, engine temperature sensor 60 may measure the cooling water temperature, which is characteristic of the engine temperature.

According to the present invention, it is then necessary to determine a setpoint value for a characteristic quantity of the mass flow to internal combustion engine 1 or cylinder 35; for instance, this quantity may be the air mass flow that flows into intake manifold 5 via actuator 20. In the following text it is to be assumed by way of example that the setpoint value for the mass flow flowing into intake manifold 5 via actuator 20 is determined as the setpoint value for the characteristic quantity of the mass flow. This determination takes place in a control unit 20 of engine control 15, control unit 20 being shown by dashed lines in FIG. 1.

An exemplary embodiment of control unit 20 is explained in the following text in FIG. 2 using a function diagram.

The setpoint charge of the combustion chamber of internal combustion engine 1 or cylinder 35, or the setpoint mass flow flowing into the combustion chamber of internal combustion engine 1 or cylinder 35 via intake valve 25 and being discharged from intake manifold 5 changes continually during the operation of internal combustion engine, especially when a vehicle is driven by internal combustion engine 1. The described control of the setting of actuator 20 ensures that the instantaneous charge follows the setpoint charge. Intake manifold 5 and the control type define the dynamics at which the instantaneous charge follows the setpoint charge. For instance, if actuator 20 is adjusted in such a way that the actual mass flow into intake manifold 5 via actuator 20 corresponds to the setpoint mass flow into the combustion chamber of cylinder(s) 35 from intake manifold 5, then the instantaneous charge of the combustion chamber follows the setpoint charge of the combustion only very slowly because no additional mass flow for charging intake manifold 5, or no reduced mass flow for emptying it, is provided.

The same problems and objectives arise if, for example, a compressor including a bypass line and a bypass valve is provided in air supply 10, followed by a throttle valve or, alternatively, a throttle valve followed by a compressor having a bypass line including a bypass valve, or if some other construction of various mass flow actuators that are known to one skilled in the art are provided for setting the mass flow that is flowing into intake manifold 5 and responsible for the charge generation or dissipation. FIG. 1 shows a throttle valve as an example of such a mass flow actuator. However, actuator 20 in FIG. 1 is representative for one or more random mass flow actuators, including their pipework, for adjusting a desired mass flow into intake manifold 5. The regulation of this actuator 20, possibly made up of a plurality of components including pipework, ensures the manner in which intake manifold 5 is emptied or charged and the dynamic response of the charge that comes about as a result.

According to the present invention, a setpoint value is then formed for the mass flow flowing from actuator 20 into intake manifold 5, or for a quantity characterizing this mass flow, in accordance with a predefined time characteristic, so that the actual charge of the combustion chamber behaves according to the dynamics specified by the predefined time characteristic. For this purpose, the setpoint value of the characteristic quantity of the mass flow is formed starting from a balance of the mass flow flowing into intake manifold 5 and the mass flow discharged from intake manifold 5, according to the predefined time characteristic. In the following text, as already described, the setpoint value for the mass flow flowing into intake manifold 5 via actuator 20 is selected as the setpoint value of the characteristic quantity of the mass flow.

In so doing, the setpoint mass flow that is to flow from actuator 20 into intake manifold 5 is calculated from the setpoint charge of the combustion chamber and the predefined time characteristic, taking the currently prevailing conditions in the intake manifold into account, particularly regarding the intake manifold pressure and the intake manifold temperature. When actuator 20 sets this setpoint mass flow within the framework of the described regulation, the desired dynamic response for the charge comes about as well, i.e., the actual charge follows the setpoint charge according to the predefined time characteristic.

Starting from driver-desired torque FW and/or torque requests of additional systems such as a traction control system, an anti-lock braking system, an electronic stability program, a vehicle speed control or the like, a resulting setpoint torque or a resulting setpoint power output of internal combustion engine 1 is determined in the manner known to one skilled in the art. In the following text, it is assumed by way of example that a resulting setpoint torque will be determined. For the sake of simplicity and as shown in FIG. 1, when describing the present invention it is assumed by way of example and without restricting the general nature, that the resulting setpoint torque corresponds to driver-desired torque FW. From the resulting setpoint torque, i.e., driver-desired torque FW in the example described here, the setpoint charge of the combustion chamber is calculated in the manner known to one skilled in the art, taking efficiency factors and engine speed n into account. In so doing, it is also possible to first condition driver-desired torque FW by means of load reversal damping and/or one or a plurality of drivability filter(s) in the manner likewise known to one skilled in the art. Notwithstanding the optionally provided filtering by load reversal damping and/or the one or the plurality of drivability filter(s), the calculated setpoint charge may still be subject to rapid changes, which the mass in intake manifold 5 is unable to follow as rapidly as may be required due to the dynamics of the intake manifold. That is to say, the actual charge is unable to be adapted to the setpoint charge at just about any rate of speed. For this reason, the setpoint mass flow into intake manifold 5 to be set by actuator 20 will be specified according to the predefined time characteristic in the present invention, so that the actual charge is able to follow the setpoint charge at the desired dynamic response that corresponds to the predefined time characteristic.

Figure 2:
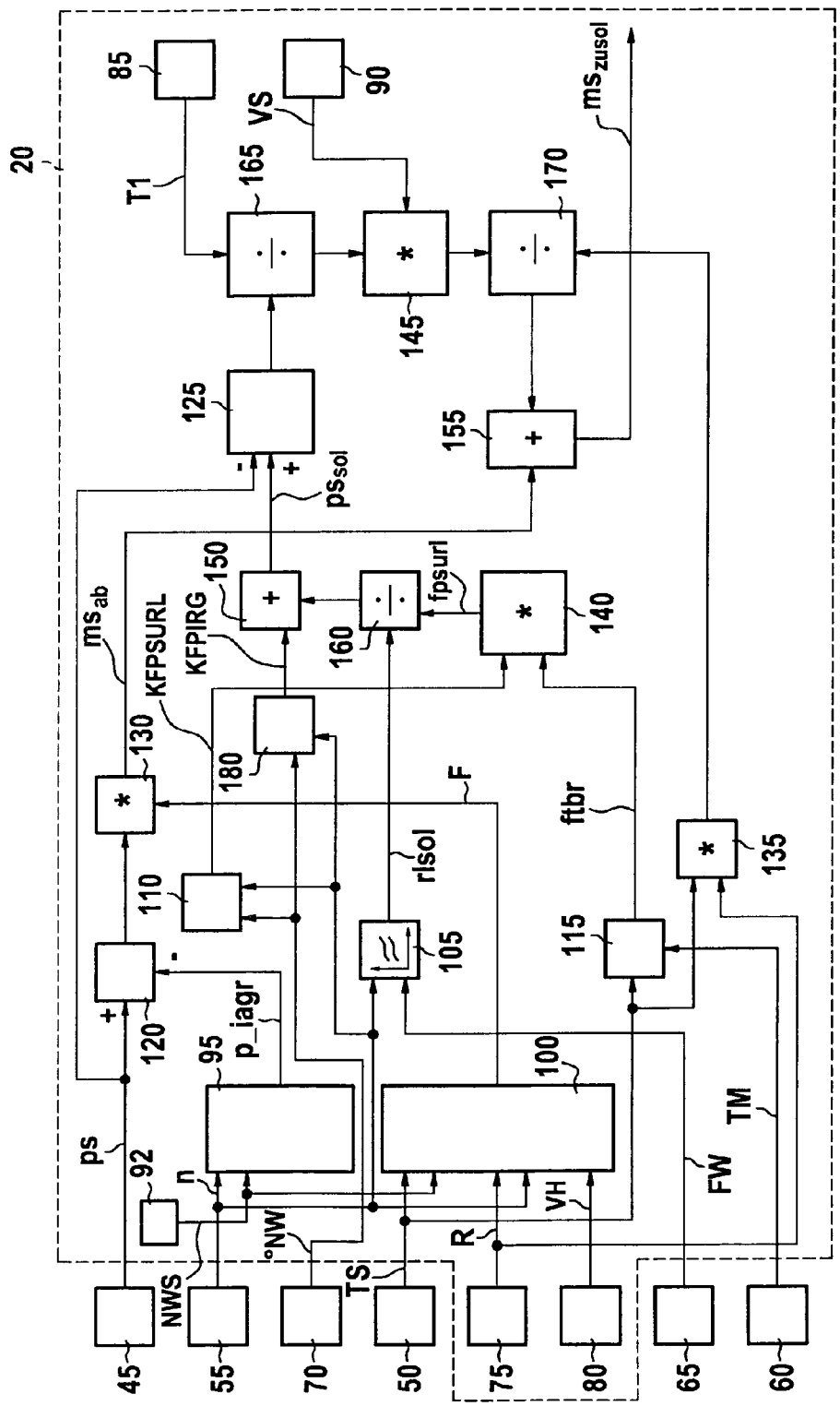
FIG. 2 shows a function diagram to explain the device according to the present invention and the method according to the present invention.

FIG. 2 shows a flow chart to explain control unit 20 of engine control 15 according to the present invention. The flow chart of FIG. 2 simultaneously represents a flow diagram which describes an exemplary sequence of the method according to the present invention. Control unit 20 may be implemented as software and/or hardware in engine control 15, for example.

Starting from the balance of the mass flow flowing into intake manifold 5 and the mass flow discharged from intake manifold 5, the setpoint value for the mass flow flowing into intake manifold 5 via actuator 20 is formed in control unit 20 according to a predefined time characteristic. In this example the predefined time characteristic is selected as time characteristic according to a proportional time element of the first order having a predefined time constant. As an alternative, it is also possible to predefine a different time characteristic, e.g., a time characteristic according to a proportional time element higher than the first order and likewise having a predefined time constant. For the balance of the mass flow flowing into intake manifold 5 and the mass flow discharged from intake manifold 5 in the present example, a temporal change of the mass in intake manifold 5 is formed as the difference between the mass flow flowing into intake manifold 5 and the mass flow discharged from intake manifold 5. This factual situation is reproduced by the following differential equation for intake manifold 5:

$$dm/dt = ms_{ZU} - ms_{ab} \tag{1}$$

M is the mass in intake manifold 5, dm/dt the temporal change of the mass in intake manifold 5, $ms_{zu}$ the mass flow flowing into intake manifold 5 via actuator 20, and $ms_{ab}$ is the mass flow discharged from intake manifold 5 into the combustion chamber. According to the present invention, this relationship for determining the setpoint mass flow is resolved for mass flow $ms_{zu}$ flowing into intake manifold 5 via actuator 20, and the temporal change of mass dm/dt in intake manifold 5 is replaced by the predefined time characteristic according to the proportional time element of the first order having the specified time constant. Mass flow $ms_{zu}$ flowing into intake manifold 5 via actuator 20 is then considered the setpoint mass flow that is to be set by actuator 20.

According to a further development of the present invention, it may then be provided that the relationship formed for determining setpoint mass flow $ms_{zu}$ by differential equation (1) is resolved for mass flow $ms_{zu}$ flowing into intake manifold via actuator 20, and thus for the setpoint mass flow, taking the ideal gas equation:

$$ps*VS = m*R*TS \tag{2}$$

into account, so that the temporal change of mass dm/dt in intake manifold 5 is converted into a temporal change dps/dt of the intake manifold pressure. In ideal gas equation (2), VS is the intake manifold volume, and R is the gas constant. From differential equation (1), taking ideal gas equation (2) into account, the following differential equation therefore results for intake manifold pressure ps:

$$VS/(R*TS)*dps/dt = ms_{ZU} - ms_{ab} \tag{3}$$

Depending on a desired output quantity of internal combustion engine 1, e.g., in the form of the resulting setpoint torque, that is to say, torque FW input by the driver or the setpoint charge derived therefrom, in this example, a setpoint value for the intake manifold pressure is formed in the manner known to one skilled in the art, and the temporal change of intake manifold pressure dps/dt is formed as the differential quotient from the difference between the setpoint value for the intake manifold pressure and an instantaneous intake manifold pressure value per time unit. The predefined time constant of the proportional time element used for the predefined time characteristic, for example, may be used as time unit in this context. By resolving for mass flow $ms_{zu}$, which flows into intake manifold 5 via actuator 20 and corresponds to the setpoint mass flow to be set by actuator 20, the following calculation rule results for this setpoint mass flow from the differential equation (3) for intake-manifold pressure ps:

$$ms_{ZU} = ms_{ab} + VS/(R*TS)*1/T_1*(pssol - ps) \tag{4}$$

$T_1$ is the predefined time constant of the proportional time element, pssol is the setpoint intake-manifold pressure, and ps is the instantaneously measured intake-manifold pressure, i.e., the actual intake-manifold pressure.

For instance, setpoint intake-manifold pressure pssol may be determined using the relationships known from DE 197 53 969 A1, as they are indicated there in FIG. 2, for example, and the associated description. Thus, the relationships known from DE 197 53 969 A1 are used for determining setpoint intake-manifold pressure pssol in control unit 20. In a corresponding manner, mass flow $ms_{ab}$ discharged from intake manifold 5 into the combustion chamber may likewise be determined in the manner known to one skilled in the art, as it is known from, e.g., DE 197 56 919 A1, and there, in FIG. 2 and the associated description, for instance. Therefore, the relationships known from DE 197 56 919 A1 are used in control unit 20 by way of example for determining mass flow $ms_{ab}$ discharged from intake manifold 5 into the combustion chamber.

First, the determination of mass flow $ms_{ab}$ discharged from intake manifold 5 into the combustion chamber is described. For this purpose, control unit 20 includes a first characteristics map 95, to which instantaneous engine speed n from engine speed sensor 55 and the currently prevailing camshaft adjustment CSA are supplied. Instantaneous camshaft adjustment CSA represents the relationship of the position of the intake camshaft relative to the position of the discharge camshaft and indicates whether, and to what extent, valve overlap, for example, exists between the simultaneous opening of intake valve 25 and discharge valve 30. Actual camshaft adjustment CSA is known in control unit 20 and stored in a fifth memory 92 of control unit 20, for example. The output quantity of first characteristics map 95 is a correction value P_iagr, which considers the system-inherent exhaust recirculation due to the valve settings of intake valve 25 and discharge valve 30 during the power cycle of internal combustion engine 1. Such an exhaust recirculation inherent to the system may be produced by valve overlap due to phases of simultaneous opening of intake valve 25 and discharge valve 30, for example, and also depends on instantaneous engine speed n. This correction value P_iagr is subtracted in a first subtraction element 120 from instantaneous intake-manifold pressure ps provided by intake-manifold pressure sensor 45. In a first multiplication element 130, the resulting effective intake-manifold pressure at the output of first subtraction element 120 is then multiplied by a factor F, which is composed of the pump equation and an empirically obtained function which combines the pulsation effects as a function of instantaneous engine speed n, and instantaneous camshaft adjustment CSA. The pump equation considers engine swept volume VH of cylinder 35, instantaneous engine speed n, gas constant R, and intake-manifold temperature TS. Factor F is determined in a calculation unit 100 from the mentioned quantities, in the following manner:

$$F=(VH*n)/2*R*TS)*f(n,CSP) \quad (5).$$

Engine swept volume VH is also known in control unit 20 and stored there in a second memory 80.

In equation (5), f(n, CSP) is the empirically obtained function which puts together the pulsation effects in intake manifold 5 as a function of instantaneous engine speed n and instantaneous camshaft adjustment CSA. The result of the multiplication in first multiplication element 130 is mass flow $ms_{ab}$ discharged from intake manifold 5 into the combustion chamber of cylinder(s) 35. It is transmitted to a second summing element 155.

To determine setpoint intake-manifold pressure pssol, driver-desired torque FW, which in this case is assumed as resulting setpoint torque by way of example, and instantaneous engine speed n are supplied to a second characteristics map 105 of control unit 20. Second characteristics map 105 then forms setpoint charge rlsol of the combustion chamber of internal combustion engine 1 in the manner known to one skilled in the art. It may optionally be provided that driver-desired torque FW or the resulting setpoint torque is optionally also supplied to a load-reversal damper and/one or more drivability filters prior to being supplied to second characteristics map 105. In a first division element 60, setpoint charge rlsol is divided by a conversion factor fpsurl, which results at the output of a third multiplication element 140. Conversion factor fpsurl at the output of third multiplication element 140 results by multiplying the output signal of a third characteristics map 110, by the output signal of a model 115. Third characteristics map 110 is supplied with instantaneous camshaft angle ° CS of the intake camshaft from camshaft-angle sensor 70 on the one hand, and with instantaneous engine speed n on the other.

In this example, camshaft-angle sensor 70 detects instantaneous camshaft setting ° CS of the intake camshaft. Starting from instantaneous setting ° CS of the intake camshaft, and given knowledge of camshaft adjustment CSA between the intake camshaft and the output camshaft, instantaneous camshaft setting ° CS of the output camshaft is specified and known as well.

Third characteristics map 110 determines a factor KFPSURL as a function of camshaft setting ° CS of the intake camshaft and instantaneous engine speed n in a manner known from DE 197 53 969 A1, which factor is transmitted to third multiplication element 140. Also in a manner known from DE 197 53 969 A1, model 115 determines a combustion-chamber temperature factor ftbr as a function of instantaneous engine temperature TM supplied by engine-temperature sensor 60, and instantaneous intake-manifold temperature TS supplied by intake-manifold temperature sensor 50. For the purpose of forming correction factor ftbr, the determined combustion-chamber temperature is standardized to a temperature of 273 K, to which the values of third characteristics map 110 are adapted. Combustion-chamber temperature correction factor ftbr is also supplied to third multiplication element 140. Thus, conversion factor fpsurl at the output of the third multiplication element results as follows:

$$fpsurl=ftbr*KFPSURL \quad (6)$$

In first division element 160, setpoint charge rlsol is then divided by conversion factor fpsurl, and the quotient that forms at the output of first division element 160 is supplied to a first summing element 150, where it is added to the output signal of a fourth characteristics map 180. On the one hand, instantaneous engine speed n is supplied to fourth characteristics map 180, and instantaneous camshaft setting ° CS of the intake camshaft on the other. The output signal of fourth characteristics map 180 is characteristics map value KFPIRG, which is supplied to first summing element 150. Fourth characteristics map 180 forms residual gas component KFPIRG according to DE 197 53 969 A1, as a function of instantaneous engine speed n and instantaneous camshaft setting ° CS of the intake camshaft. As described in DE 197 53 969 A1 but not shown in FIG. 2 for reasons of clarity, the read-out value KFPIRG of fourth characteristics map 180 may be multiplied in a multiplication point by a correction factor derived from a measured ambient pressure, in order to implement an altitude correction.

Thus, the possibly altitude-corrected value KFPIRG of fourth characteristics map 180 is added to quotient rlsol/fpsurl in first summing element 150 in order to form setpoint intake-manifold pressure pssol at the output of first summing element 150. This result is supplied to a second subtraction element 125, to which instantaneous intake-manifold pressure ps is supplied as well. Instantaneous intake-manifold pressure ps is subtracted from setpoint intake-manifold pressure pssol in second subtraction element 125. The difference that forms is divided in a second division element 165 by predefined time constant T1, which is stored in a third memory of control unit 20. Predefined time constant T1 may be suitably applied on a test stand and/or in road tests, for example, in order to realize a desired predefined time characteristic of the actual charge. In this application of predefined time constant T1, a desired fuel consumption and/or a desired response behavior of the internal combustion engine to a driver's input or a torque input by a driver and/or a desired reproducibility for adjusting the desired output quantity of internal combustion engine 1, e.g., the torque input by the driver, via the setpoint mass flow into intake-manifold 5 is able to be determined such that, for example, the fuel consumption and/or the response behavior, and/or the desired reproducibility assume an optimal value in each case. In an advantageous manner, the response behavior, for example, may be optimized at a higher priority than the desired reproducibility, and the desired reproducibility at a higher priority than the fuel consumption. At the output of second division element 165, quotient (pssol−ps)/T1 results, which is supplied to a fourth multiplication element 145, where it is multiplied by intake-manifold volume VS, which is known in control unit 20 and stored in a fourth memory 90. The product formed by fourth multiplication element 145 is supplied to a third division element 170, where it is divided by the output of a second multiplication element 135. The output of second multiplication element 135 results from the multiplication of instantaneous intake-manifold temperature TS by gas constant R, which is stored in a first memory 75 of control unit 20. In second summing element 155, the quotient formed at the output of third division element 170 is added to mass flow $ms_{ab}$ discharged from intake manifold 5 into the combustion chamber, at the output of first multiplication element 130. The sum that is formed at the output of second summing element 155 then is setpoint mass flow $ms_{zusol}$, which is to be set via actuator 20 and to flow via actuator 20 into intake manifold 5. Thus, setpoint mass flow $ms_{zusol}$ at the output of second summing element 155 corresponds to the value of the inflowing mass flow $ms_{zu}$ calculated according to equation (4).

If actuator 20 now adjusts this setpoint mass flow $ms_{zusol}$, the desired charge dynamic according to the predefined time characteristic comes about as well. This predefined charge dynamic may in turn be utilized by other functions of the engine control such as for predicting performance quantities of internal combustion engine 1. The intake-manifold pressure inside intake manifold 5 also builds up at the same dynamics as that of setpoint mass flow $ms_{zusol}$.

According to the example described, in an abrupt change of the setpoint charge, the actual charge is generated according to the predefined time characteristic of the proportional time element of the first order, for example.

Due to the replacement of the temporal change of the intake-manifold pressure as differential quotient from the difference between setpoint intake-manifold pressure pssol and instantaneous intake-manifold pressure ps per predefined time constant T1 of the proportional time element of the first order, for instance, the control error in this case, i.e., the deviation between setpoint intake-manifold pressure pssol and instantaneous intake-manifold pressure ps in the form of a difference pssol−ps, behaves like the delay element in the form of the proportional time element of the first order selected for the predefined time characteristic. Thus, the desired dynamic according to the predefined time characteristic also results for the difference between the actual charge and the setpoint charge.

What is claimed is:

1. A method for operating an internal combustion engine having a mass-flow line, via which a mass flow is supplied to the internal combustion engine, the method comprising:
   predefining a setpoint value for a characteristic quantity of mass flow to the internal combustion engine, wherein the setpoint value of the characteristic quantity of the mass flow is formed starting from a difference of the mass flow flowing into the mass flow line and the mass flow discharged from the mass flow line, according to a predefined time characteristic,
   wherein the predefined time characteristic is selected as time characteristic according to a proportional time element having a predefined time constant, and
   wherein the proportional time element is of the first order.

2. The method as recited in claim 1, wherein a setpoint value for the mass flow is selected as the setpoint value of the characteristic quantity of the mass flow, and the mass flow flowing into the mass flow line is selected as the setpoint value for the mass flow in the balance of the mass flow flowing into the mass flow line and the mass flow discharged from the mass flow line.

3. The method as recited in claim 1, wherein a temporal change of the mass flow in the mass flow line is formed as the difference between the inflowing mass flow and the discharged mass flow, and this relationship for determining the setpoint value of the characteristic quantity of the mass flow is resolved for the inflowing mass flow, and the temporal change of the mass in the mass flow line is replaced by the predefined time characteristic.

4. The method as recited in claim 2, wherein a temporal change of the mass flow in the mass flow line is formed as the difference between the inflowing mass flow and the discharged mass flow, and this relationship for determining the setpoint value of the characteristic quantity of the mass flow is resolved for the inflowing mass flow, and the temporal change of the mass in the mass flow line is replaced by the predefined time characteristic.

5. The method as recited in claim 1, wherein a temporal change of the mass flow in the mass flow line is formed as the difference between the inflowing mass flow and the discharged mass flow, and this relationship for determining the setpoint value of the characteristic quantity of the mass flow is resolved for the inflowing mass flow, and the temporal change of the mass in the mass flow line is replaced by the predefined time characteristic.

6. The method as recited in claim 3, wherein the relationship for determining the setpoint value of the characteristic quantity of the mass flow is resolved for the inflowing mass flow, taking the ideal gas equation into account, so that the temporal change of the mass in the mass flow line is converted into a temporal change of the pressure in the mass flow line, a setpoint value for the pressure is formed as a function of a desired output quantity of the internal combustion engine, and the temporal change of the pressure is formed as differential quotient from the difference between the setpoint value for the pressure and an instantaneous pressure per time unit.

7. The method as recited in claim 4, wherein the relationship for determining the setpoint value of the characteristic quantity of the mass flow is resolved for the inflowing mass flow, taking an ideal gas equation into account, so that the temporal change of the mass in the mass flow line is converted into a temporal change of a pressure in the mass flow line, a setpoint value for the pressure is formed as a function of a desired output quantity of the internal combustion engine, and the temporal change of the pressure is formed as differential quotient from the difference between the setpoint value for the pressure and an instantaneous pressure per time unit.

8. The method as recited in claim 5, wherein the relationship for determining the setpoint value of the characteristic quantity of the mass flow is resolved for the inflowing mass flow, taking the ideal gas equation into account, so that the temporal change of the mass in the mass flow line is converted into a temporal change of the pressure in the mass flow line, a setpoint value for the pressure is formed as a function of a desired output quantity of the internal combustion engine, and the temporal change of the pressure is formed as differential quotient from the difference between the setpoint value for the pressure and an instantaneous pressure per time unit.

9. The method as recited in claim 8, wherein the predefined time constant is selected as time unit.

10. The method as recited in claim 1, wherein the predefined time characteristic is determined with regard to at least one of: a desired fuel consumption, a desired response behavior, and a desired reproducibility for adjusting a desired output quantity of the internal combustion engine using the setpoint value of the characteristic quantity of the mass flow.

11. The method as recited in claim 2, wherein the predefined time characteristic is determined with regard to at least one of: a desired fuel consumption, a desired response behavior, and a desired reproducibility for adjusting a desired output quantity of the internal combustion engine using the setpoint value of the characteristic quantity of the mass flow.

12. The method as recited in claim 1, wherein the predefined time characteristic is determined with regard to at least one of: a desired fuel consumption, a desired response behavior, and a desired reproducibility for adjusting a desired output quantity of the internal combustion engine using the setpoint value of the characteristic quantity of the mass flow.

13. The method as recited in claim 3, wherein the predefined time characteristic is determined with regard to at least one of: a desired fuel consumption, a desired response behavior, and a desired reproducibility for adjusting a desired output quantity of the internal combustion engine using the setpoint value of the characteristic quantity of the mass flow.

14. The method as recited in claim 6, wherein the predefined time characteristic is determined with regard to at least one of: a desired fuel consumption, a desired response behavior, and a desired reproducibility for adjusting a desired output quantity of the internal combustion engine using the setpoint value of the characteristic quantity of the mass flow.

15. A device for operating an internal combustion engine having a mass-flow line, via which a mass flow is supplied to the internal combustion engine, comprising:
- a control unit which predefines a setpoint value for a characteristic quantity of the mass flow to the internal combustion engine, wherein the control unit is designed in such a way that it forms the setpoint value of the characteristic quantity of the mass flow starting from a difference of the mass flow flowing into the mass flow line and the mass flow discharged from the mass flow line according to a predefined time characteristic,
- wherein the predefined time characteristic is selected as time characteristic according to a proportional time element having a predefined time constant, and
- wherein the proportional time element is of the first order.

* * * * *